Figure 1:
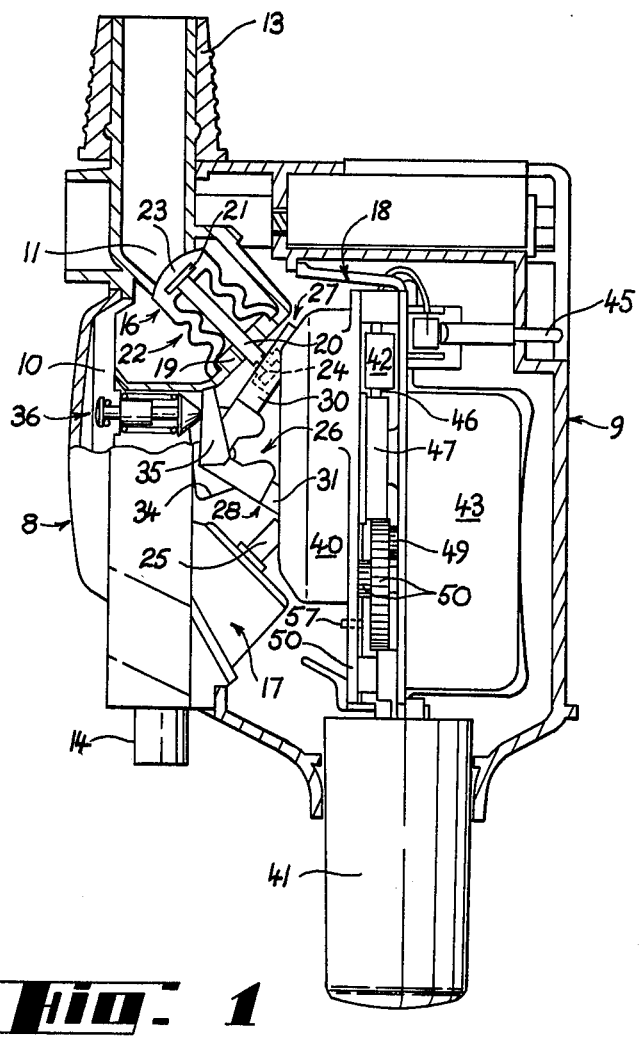

United States Patent [19]

Bayly et al.

[11] 4,440,326

[45] Apr. 3, 1984

[54] DISPENSING DEVICE

[75] Inventors: Peter K. Bayly, Eltham North; John E. Oretti, Doncaster, both of Australia

[73] Assignee: Peter Bayly Associates Australia Pty., Australia

[21] Appl. No.: 270,369

[22] Filed: Jun. 4, 1981

[30] Foreign Application Priority Data

Jun. 6, 1980 [AU] Australia .............................. PE3938

[51] Int. Cl.³ ............................................. G01F 11/28
[52] U.S. Cl. ..................................... 222/450; 222/449
[58] Field of Search ................ 222/447, 448, 449, 450

[56] References Cited

U.S. PATENT DOCUMENTS

| | | | |
|---|---|---|---|
| 2,865,538 | 12/1958 | Newman | 222/449 |
| 3,596,812 | 8/1971 | Pandajis et al. | 222/449 |
| 4,308,978 | 5/1982 | Bayly et al. | 222/449 |

*Primary Examiner*—Joseph J. Rolla
*Assistant Examiner*—Charles C. Compton
*Attorney, Agent, or Firm*—Lerner, David, Littenberg, Krumholz & Mentlik

[57] ABSTRACT

A dispenser device is described having a metering chamber provided with inlet and outlet ports. Independently mounted, angularly disposed valves are associated with the ports. An activator comprising a cam wheel driven by an electric motor operates the valves in predetermined sequence through valve control arms respectively associated with each of the valves. The valve control arms are pivotally mounted and co-operate with an extension of the valve stem extending externally of the metering chamber. The electric motor is actuated by a button operating through a lever so as to close a switch. The cam wheel includes a switch cam track which holds the switch closed for a full cycle of the dispenser. Also a deactivating cam track is arranged to displace the lever so that manipulation of the button cannot effect the dispenser operation once the cycle has been initiated.

9 Claims, 3 Drawing Figures

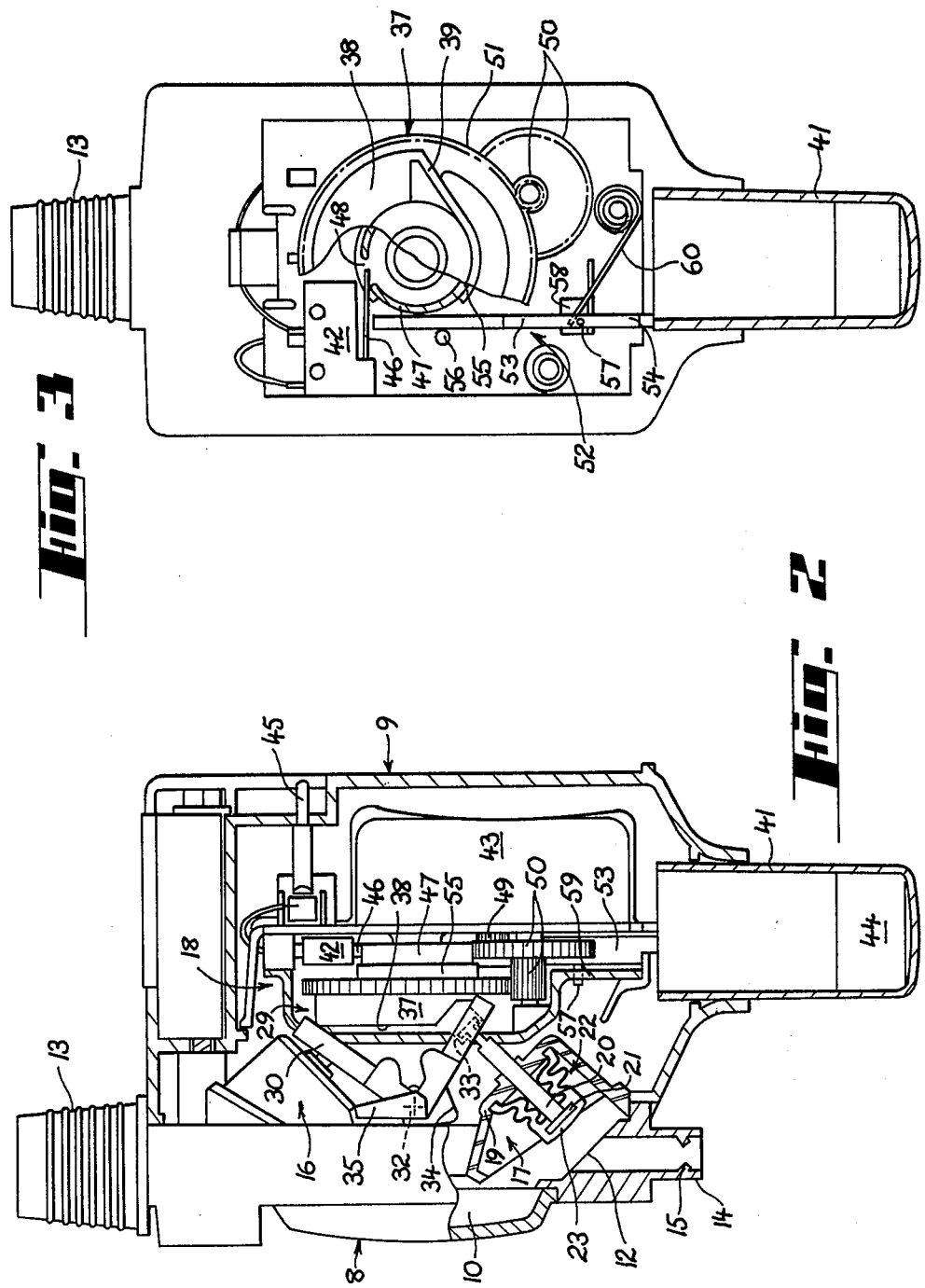

DISPENSING DEVICE

This invention relates to dispensers for liquids, powders, and other flowable materials, and is particularly concerned with such dispensers having a metering facility. It will be convenient to hereinafter describe the invention with particular reference to liquid dispensers, but the invention has other applications.

Liquid dispensers of the metering kind are commonly used in establishments catering to the public, and it is therefore necessary that they be both accurate and hygenic in use. Such dispensers as used prior to this invention however, have generally failed to meet at least one, if not both, of those requirements.

Dispensers of the foregoing kind are generally actuated through mechanical means such as by movement of articulated levers with the result that many of those constructions are complicated and are not entirely satisfactory in operation.

It is an object of the present invention to provide a dispenser device which is accurate in operation and is relatively simple in construction. It is a preferred object of the present invention to provide a dispenser device which is electrically actuated.

According to the present invention there is provided a dispenser device including, a metering chamber having an inlet port and an outlet port, an inlet valve operative to open and close said inlet port in fill and discharge conditions respectively of said metering chamber, an outlet valve operative to close and open said outlet port in said fill and discharge conditions respectively, actuator means operative to cause movement of said valves to effect a change of the said condition of said metering chamber, said actuator means having start and activated conditions, said start condition corresponding to said fill condition of said metering chamber, and said actuator means including cam means operatively associated with said valves and arranged so that operation of said cam means from the start condition causes the inlet valve to close the inlet port before the outlet valve is caused by the cam means to open the outlet port.

Preferably the actuator means operates the valves through valve control means which is movable by the cam means between two extreme conditions, the arrangement being such that the fill condition exists at one of the extreme conditions and the discharge condition exists as the other. The valve control means preferably includes an inlet valve control member and an outlet valve control member respectively associated with the inlet and outlet valves, the cam means being arranged to contact the control members to operate the valves in a predetermined sequence.

In the preferred embodiment each valve includes a tail portion extending externally of the metering chamber and towards the valve control means, and each valve control member comprises a valve control arm pivotally movable about one end thereof relative to the metering chamber in response to operation of the cam means, a portion of each valve control arm remote from said one end being operatively associated with the tail portion of the associated valve so that pivotal movement of each control arm causes operation of the associated valve.

Preferably each valve includes valve biasing means operative to urge the valve into a port closing position, and each valve control arm is operatively associated with control biasing means operative to maintain the respective valve control arm in contact with the cam means, and to urge the associated valve into its port opening position, the control biasing means applying a stronger force than the valve biasing means, and the cam means being operative to move the valve control arms against the action of the associated control biasing means to allow the valve biasing means to close the associated ports during predetermined parts of the operating cycle of the dispenser device. This arrangement enables positive opening and closing of the inlet and outlet valves in the desired sequence with a relatively simple construction. Preferably the cam means comprises a cam wheel having a valve cam track thereon, the valve cam track being operatively associated with the valve control means. In this arrangement preferably one cycle of the actuator means comprises starting from its start condition, passing through its activated condition during part of which the metering chamber is in its discharge condition, and returning to the start condition, the cam wheel being arranged to turn through substantially 360° during each one cycle.

The dispenser device may conveniently be electrically operable and accordingly the actuator means many include a manually operable actuator button, a switch arranged to be closed in response to operation of the actuator button and an electric motor arranged to be energised upon closing the switch the electric motor being drivably coupled to the cam wheel to thereby operate the valve control means. To ensure that the operating cycle cannot be interrupted and a short measure dispensed, the cam wheel preferably has a switch cam track arranged to maintain the switch closed until the cam wheel has turned substantially 360° after manual operation of the actuator button.

To prevent accidental continuous cycling of the dispenser, such as may be caused by maintaining pressure on or sticking of the actuator button, the actuator means preferably includes deactivating means operable to prevent closing of the switch by operation of the actuator button until the metering chamber has been returned to its fill condition and the actuator button has been released.

An example embodiment of the present invention will now be described with reference to the accompanying drawings, in which:

FIG. 1 is partially sectional view of a dispenser device according to a preferred embodiment of the present invention, the device being in its discharge condition, FIG. 2 is a similar view to FIG. 1 with the device in its discharge condition, and FIG. 3 is a view of the actuator means of the dispenser.

The illustrated liquid dispenser is of the kind used for bottles and similar containers in hotels and the like, for providing a measured discharge of the contents—e.g. spirits. Bottles having such dispensers are usually mounted upside down on a suitable support with the dispenser attached to the neck of the bottle.

The dispenser includes a metering chamber 10 of an appropriate size and having an inlet port 11 and an outlet port 12 to allow passage of liquid into and out of the chamber 10. The inlet port 11 communicates with means for attaching the dispenser to the neck of the bottle and that may comprise a resilient plug 13 which can be firmly retained within the bottle neck and having an open ended passage therethrough communicating with the inlet port 11. The outlet port 12 may communicate direct with a discharge nozzle 14, which may be in the form of a tubular member projecting outwardly from the body of the metering chamber 10. The nozzle 14 may be provided with a restriction 15 to inhibit dripping. It will be apparent that many variations of the bottle attaching means and discharge nozzle are available.

An inlet valve 16 is operative to open and close the inlet port 11 and an outlet valve 17 is operative to close and open the outlet port 12. The metering chamber 10 has a fill condition in which the inlet port 11 is open and the outlet port 12 is closed, and a discharge condition in which the inlet port 11 is closed and the outlet port 12 is open. Actuator means 18 is operative to cause movement of the valves 16, 17 to effect a change of the condition of the metering chamber 10, the arrangement being such that the inlet valve 16 closes the inlet port 11 before the outlet valve 17 opens the outlet port 12 during a change from the fill condition to the discharge condition. Preferably the actuator means 18 is also operative to close the outlet port 12 before the inlet port 11 is re-opened during a change from the discharge condition to the fill condition since it is undesirable to have both ports 11, 12 open for any significant period of time as that complicates the metering operation.

Each valve 16, 17 is independently mounted on part of the dispenser body for reciprocatory movement towards and away from its respective port 11, 12. A portion of that body part forms a wall or part of a wall 19 of the metering chamber 10, and the axes of the valves 16, 17 are angularly disposed—e.g. the subtended angle is approximately 90° Each valve 16, 17 includes a stem 20 slidably mounted in the wall part 19 of the metering chamber 10 and a head portion 21 located within the chamber 10. A resilient sleeve 22 which has an end wall 23 at one end and is open at its other end has its end wall 23 located over and attached to the head portion 21 and its open end attached to the wall part 19. The sleeve 22 is subjected to axial compression in the port open position of the respective valve 16, 17 and thereby applies a biasing force to urge the valve into a port closing position, and the end wall 23 engages a surface surrounding the respective port 11, 12 in the port closing position. If desired, a helical compression spring (not shown) may be located about the stem 20 so as to act between the head 21 and the wall part 19 and assist the biasing action of the bellows-shaped sleeve 22. A substantially fluid tight seal can be formed between the rear end of the sleeve 22 and the wall 19 so that the sleeve 22 perform the dual functions of biasing and sealing. For purposes to be explained later the inlet and outlet valves 16, 17 have tail portions 24, 25 respectively which extend externally of the metering chamber 10 and towards the actuator means 18. The tail portions 24, 25 are conveniently integral extensions of the stems 20.

The actuator means 18 influences the valves 16, 17 through valve control means 26 which is movable by the actuator means 18 between two extreme conditions, the arrangement being such that the fill condition of the metering chamber 10 exists at one of the extreme conditions and the discharge condition of the metering chamber 10 exists at the other (FIGS. 1 and 2). The actuator means 18 has start and activated conditions, the start condition corresponding to the fill condition of said metering chamber 10.

The valve control means 26 is mounted on a front body section 8 forming the metering chamber 10 and the actuator means 18 is mounted in a rear body section 9, and the two body sections 8, 9 are detachably secured together.

The valve control means 26 includes an inlet valve control member 27 and an outlet valve control member 28 respectively associated with the inlet and outlet valves 16, 17. The actuator means 18 includes cam means 29 associated with the valve control members 27, 28 and arranged so that operation of the cam means 29 from the start condition of the actuator means 18 causes the inlet valve control member 27 to operate the inlet valve 16 to close the inlet port 11 before the outlet valve control member 28 is caused by the cam means 29 to operate the outlet valve 17 to open the outlet port 12. Each valve control member 27, 28 comprises a valve control arm 30, 31 pivotally movable about an axis 32 at one end thereof relative to the front body section 8 in response to operation of the cam means 29, a portion of each valve control arm 30, 31 remote from the axis 32 being operatively associated with the tail portion 24, 25 of the associated valve 16, 17 so that pivotal movement of each control arm 30, 31 causes operation of the associated valve. As shown, the tail portions 24, 25 are provided with knobs which are received in recesses 33 in the respective valve control arms 30, 31.

Each valve control arm 30, 31 is operatively associated with control biasing means 34 operative to maintain the respective valve control arm 30, 31 in contact with the cam means 29 and to urge the associated valve 16, 17 into its port opening position. The control biasing means 34 applies a stronger force than the valve biasing means resilient sleeve 22 and the cam means 29 is operative to move the valve control arms 30, 31 against the action of the control biasing means 34 to allow the resilient sleeve 22 to close the associated ports during predetermined parts of the operating cycle of the dispenser device. The control biasing means 34 is shown as a generally C-shaped leaf spring that passes behind the axis 32 and bears against both the arms 30, 31.

The outlet valve control arm 31 is provided with an extension 35 which opens the air bleed valve 36 in metering chamber 10 when the outlet port 12 is opened. This ensures rapid discharge of the chamber contents.

The cam means 29 comprises a cam wheel 37 having a valve cam track 38 thereon, the valve cam track 38 being in engagement with the valve control arms 30, 31. One cycle of the actuator means 18 comprises starting from the start condition, passing through the activated condition during part of which the metering chamber 10 is in its discharge condition (FIGS. 1 and 2) and returning to the start condition, the cam wheel 37 being arranged to turn through substantially 360° during each one cycle. The cam wheel 37 has a ramp 39 (FIG. 3) leading up to the valve cam track 38 so that as the cam wheel 37 rotates clockwise in FIG. 3 the valve control arms 30, 31 are progressively moved to close the associated valves 16, 17. The valve cam track 38 preferably has a step (not shown in FIG. 3 where the cam wheel 37 is sectioned) at its end remote from the ramp 39 so that the valve control arms 30, 31 rapidly open the associated valves 16, 17 under the influence of spring 34. The cam wheel 37 may be covered by a cam cover 40 provided with a diametrically disposed slot through which the valve control arms 30, 31 project (FIG. 2), the slot inhibiting lateral movement of the arms 30, 31.

The actuator means 18 further includes a manually operable actuator button 41, a switch 42 arranged to be closed in response to operation of the actuator button 41, and an electric motor 43 arranged to be energised upon closing the switch 42, the electric motor 43 being drivably coupled to the cam wheel 37 to thereby operate the valve control means 26. A weight 44 or other biasing means (such as a spring) is provided to normally urge the button 41 into a lower position at which it protrudes out of the lower wall of the rear body section 9 to a maximum extent. The button 41 is operable in its fully depressed or least protruding condition, to close the switch 42 through which a source of electrical energy can be connected through pins 45 to energise the motor 43. The switch 42 is provided with an operating blade 46 which is depressed when the button 41 is depressed. The cam wheel 37 has a switch cam track 47 arranged to maintain the switch 42 closed until the cam wheel 37 has turned substantially 360° after manual operation of the actuator button 41. As illustrated in FIG. 3 the switch cam track 47 is arranged to maintain blade 46 depressed as soon as the cam wheel 37 starts to rotate. When the cam wheel 37 has turned 360°, the gap 48 in the track 47 allows blade 46 to spring back to open the switch 42. Thus once the button 41 is operated, the motor 43 is automatically kept energised until the cam wheel 37 has rotated through 360°.

The motor 43 has an output drive shaft 49 which transmits drive through reduction gear train 50 to cam wheel 37 by means of gear teeth 51 provided around the cam wheel 37. This enables use of a motor 43 having a higher speed than could be used with direct coupling of the motor drive shaft 49 to the cam wheel 37.

The actuator means 18 further includes deactivating means 52 operable to prevent closing of the switch 42 by operation of the actuator button 41 until the metering chamber 10 has been returned to its fill condition and the actuator button 41 has been released. The deactivating means 52 comprises a deactivating lever 53 extending between the actuator button 41 and the switch 42 and passing close by the cam wheel 37. The lower end 54 of deactivating lever 53 is engageable by the actuator button 41 to cause the lever 53 to contact the blade 46 and close the switch 42. The cam wheel has a deactivating cam track 55 engageable with the lever 53 immediately after the switch 42 is closed and the cam wheel 37 begins to rotate to cause the lever 53 to pivot about a fulcrum 56 located between the deactivating cam track 55 and the end 54 of the lever 53, pivoting of the lever 53 displaces the end 54 laterally (to the right in FIG. 3) and out of engagement with the actuator button 41. The deactivating cam track 55 is operative to hold the end 54 laterally displaced until the metering chamber 10 has been returned to its fill condition and the actuator button 41 has been released. The pivoting movement of the lever 53 is achieved by providing the lever 53 with a laterally projecting lug 57 which is loosely received in socket 58 provided in a flange 59 (FIG. 2) of the cam housing 40. A spring arm 60 biases the lug 57 into the bottom left hand corner of the socket 58 as seen in FIG. 3, thus maintaining the lever end 54 aligned with the button 41 when the button 41 is released and the cam wheel 37 is in its start position shown in FIG. 3.

When the switch 42 is closed, the deactivating cam track 55 contacts the upper end of the lever 53 and the lug 57 shifts in the socket 58 as the lower end 54 is displaced away from the button 41. The button 41 must be released and the cam wheel 37 must be in its start position shown in FIG. 3 before the dispenser can be operated again.

In operation of the device shown in the drawings and described above, the outlet valve 17 is closed and the inlet valve 16 is open immediately prior to initial energisation of the motor 43. Immediately following energisation of the motor 43, the valve cam track 38 functions to cause closing of the inlet valve 16 so that both valves 16, 17 are closed at that time. The track 38 next causes the outlet valve 17 to open while leaving the inlet valve 16 in the closed condition. The valves 16, 17 are therefore placed in the discharge condition and that condition is preferably maintained for substantially one half revolution of the cam wheel 37, at the end of which time the metering chamber 10 will have emptied and the valve cam track 38 then operates to cause the outlet valve 17 to be moved into the closed condition. Subsequently, the track 38 functions to return the valves 16, 17 to the fill condition at which the inlet valve 16 is opened and the outlet valve 17 is closed. That condition of the valves remains until the end of the cycle to ensure complete filling of the metering chamber 10 and during that filling operation the actuator button 41 is rendered inoperable in the manner previously described.

When the construction particularly described is mounted on a bottle ready for operation, the actuator button 41 will be in its lowermost position. Consequently, the valves 16, 17 will be in the fill condition and the metering chamber 10 will be full of liquid received from the bottle through the open inlet port 11. An operator who holds a glass under the discharge nozzle 14 with one hand can engage the actuator button 41 with a finger of the same hand and push that button 41 upwards. During the first part of that upward movement the button 41 has no influence on the valve condition, but subsequent engagement with the lever 53 results in the closing of the switch 42 with consequent energisation of the motor 43. Operation of the mechanism then continues in the manner previously described and the actuator button 41 loses further influence over the discharge operation until a cycle has been completed.

It will be understood from the foregoing description that the present invention provides a relatively simple and hygenic dispenser which is particularly suited for use with liquids. The mechanism is substantially tamper-proof because the only means of external influence on the discharge operation is through the actuator button 41 and that button is deactivated immediately the discharge operation commences and is held in that condition until the metering chamber 10 has been refilled in preparation for the next cycle.

If desired, the valve control mechanism may be arranged so that a separate cam track influences each of the valves 16, 17 either during the entire cycle or part of the cycle.

What we claim is:

1. A dispenser device including, a metering chamber having an inlet port and an outlet port, an inlet valve operative to open and close said inlet port in fill and discharge conditions respectively of said metering chamber, an outlet valve operative to close and open said outlet port in said fill and discharge conditions respectively, each said valve including a tail portion extending externally of said metering chamber, valve control means which is movable between two extreme conditions, the arrangement being such that said fill condition exists at one of said extreme conditions and said discharge condition exists at the other, said valve control means including an inlet valve control arm and an outlet valve control arm respectively associated with said inlet and outlet valves, the valve control arms being pivotally movable relative to the metering chamber, a portion of each valve control arm being operatively associated with the tail portion of the associated valve so the pivotal movement of each control arm causes operation of the associated valve, actuator means operative to cause movement of said valves to effect a change of the said condition of said metering chamber, said actuator means having start and activated conditions, said start condition corresponding to said fill condition of said metering chamber, and said actuator means including cam means operatively associated with said valve control means and arranged so that operation of said cam means from the start condition causes the inlet valve control arm to operate the inlet valve to close the inlet port before the outlet valve is caused by the cam means acting through the outlet valve control arm to open the outlet port.

2. A dispenser device according to claim 1, wherein said inlet and outlet valve control arms are separately pivotally mounted so as to be pivotally movable independently.

3. A dispenser according to claim 1, wherein each said valve includes valve biasing means operative to urge the valve into a port closing position, and each said valve control arm is operatively associated with control biasing means operative to maintain the respective valve control arm in contact with the cam means, and to urge the associated valve into its port opening position, said control biasing means applying a stronger force than said valve biasing means, said cam means being operative to move the valve control arms against the action of the associated control biasing means to allow the valve biasing means to close the associated ports during predeterminded parts of the operating cycle of the dispenser device.

4. A dispenser device according to claim 1 or 3, wherein said cam means comprises a cam wheel having a valve cam track thereon, the valve cam track being operatively associated with the valve control means.

5. A dispenser device according to claim 4, wherein one cycle of said actuator means comprises starting from said start condition, passing through said activated condition during part of which said metering chamber is in said discharge condition, and returning to said start condition, said cam wheel being arranged to turn through substantially 360° during each said cycle.

6. A dispenser device according to claim 5, wherein said actuator means further includes a manually operable actuator button, a switch arranged to be closed in response to operation of said actuator button and an electric motor arranged to be energised upon closing said switch, said electric motor being drivably coupled to said cam wheel to thereby operate the valve control means.

7. A dispenser device according to claim 6, wherein said cam wheel has a switch cam track arranged to maintain said switch closed until the cam wheel has turned substantially 360° after manual operation of the actuator button.

8. A dispenser device according to claim 6, wherein said actuator means further includes deactivating means operable to prevent closing of said switch by operation of said actuator button until said metering chamber has been returned to said fill condition and said actuator button has been released.

9. A dispenser device according to claim 8, wherein said deactivating means comprises a deactivating lever extending between the actuator button and the switch and passing close by said cam wheel, said deactivating lever having an end engageable by said actuator button to cause the lever to close said switch, said cam wheel having a deactivating cam track engageable with said lever immediately after said switch is closed and said cam wheel begins to rotate to cause said lever to pivot about a fulcrum located between said deactivating cam track and said end of the lever said pivoting of the lever displacing said end of the lever laterally and out of engagement with the actuator button, said deactivating cam track being operative to hold said end of the lever laterally displaced until said metering chamber has been returned to said fill condition and said actuator button has been released.

* * * * *